Nov. 14, 1939.  L. C. CATTOI  2,180,033
FLARING TOOL
Filed Feb. 21, 1938  2 Sheets-Sheet 1
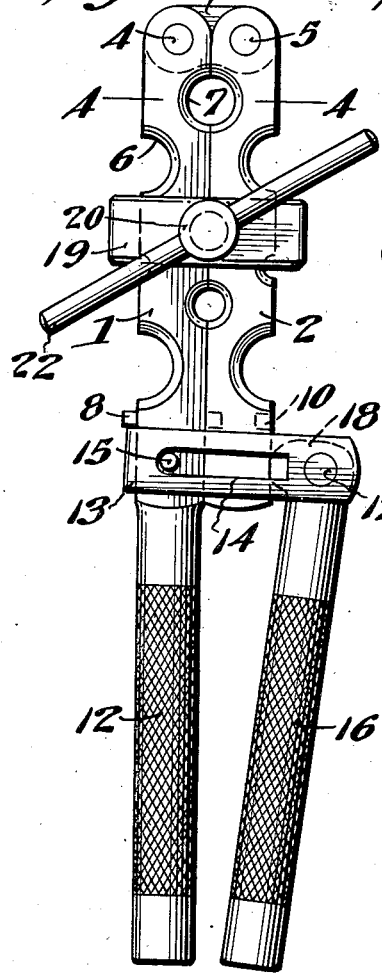
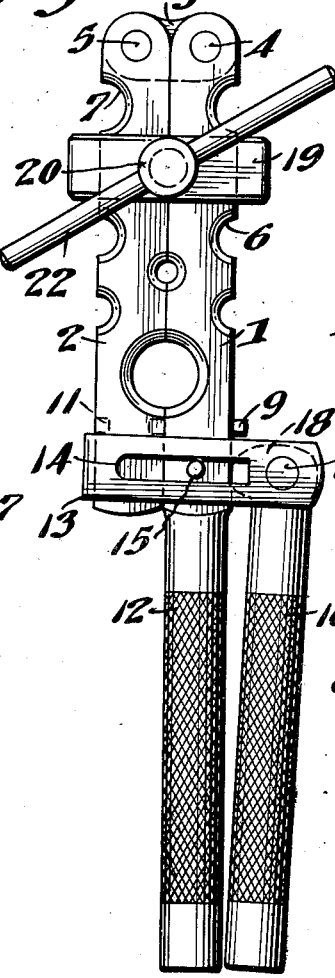
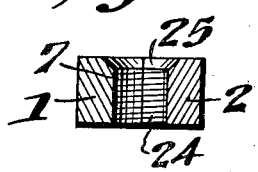
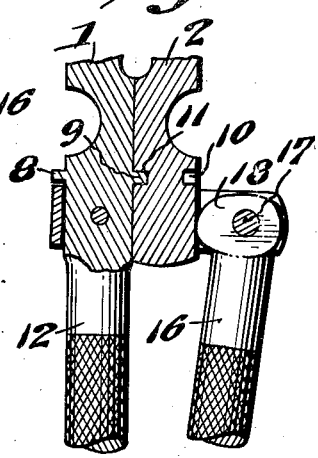
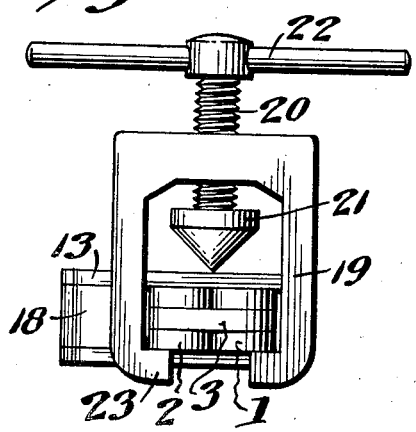
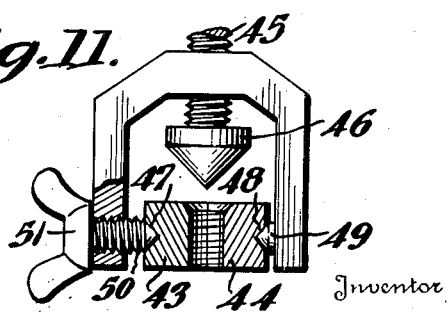
Inventor
Louis C. Cattoi
By Lloyd W. Patch
Attorney Nov. 14, 1939. L. C. CATTOI 2,180,033
FLARING TOOL
Filed Feb. 21, 1938 2 Sheets-Sheet 2
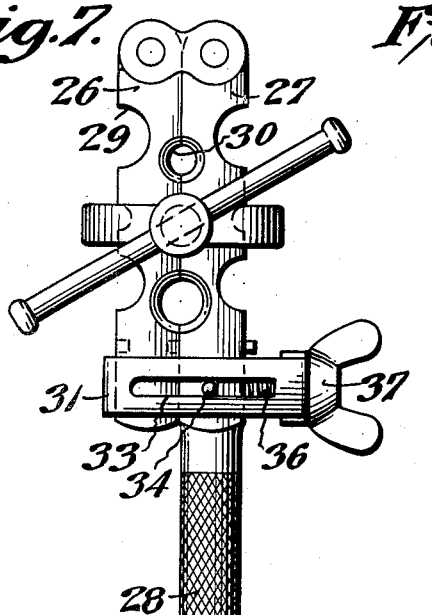
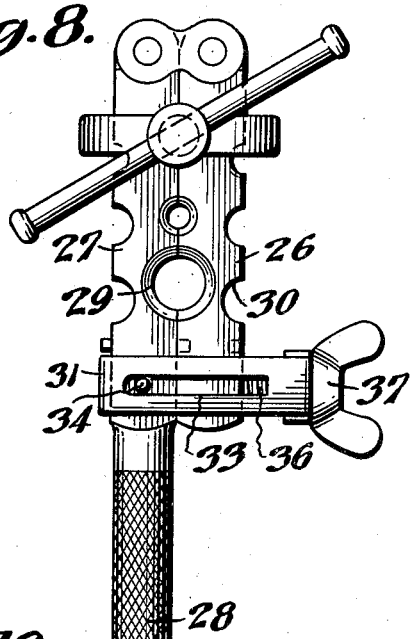
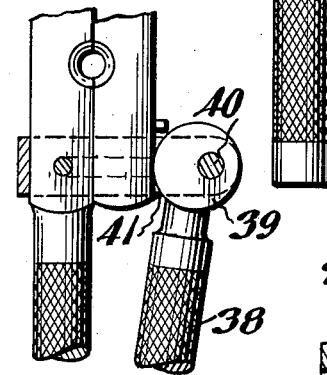
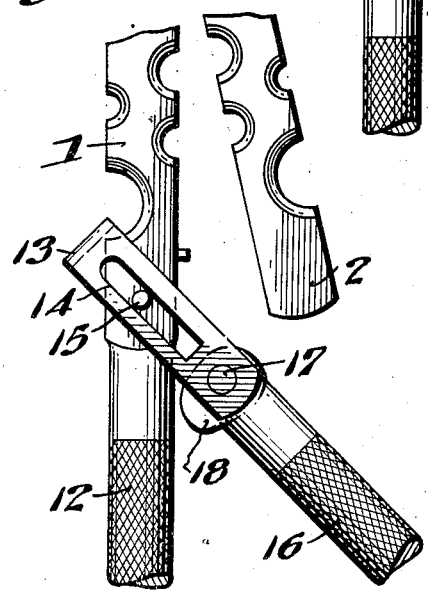
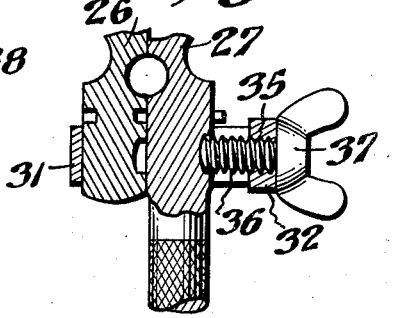
Inventor
Louis C. Cattoi
By Lloyd W. Pateh
Attorney Patented Nov. 14, 1939

2,180,033

UNITED STATES PATENT OFFICE 2,180,033

FLARING TOOL

Louis C. Cattoi, Hurley, Wis., assignor to E. Edelmann & Co., Chicago, Ill., a corporation of Illinois Application February 21, 1938, Serial No. 191,802

6 Claims. (Cl. 153—79)

This invention relates to flaring tools, and particularly to a hand tool intended and adapted for use in flaring the ends of copper, brass, lead, or other soft or expansible tubing or pipes.

The primary object is to provide a device of this character which can be used to flare or work upon a plurality of different sizes or diameters of tubes or pipes, and which is yet of such compact form that it can be readily and conveniently handled and used or operated.

Another object is to provide a tool of this character having a pair of jaws swingably connected or linked together to thus allow reversal to bring opposite faces of the jaws into bearing juxtaposition, while each of said jaws is provided on opposite faces with a plurality of grooves or recesses that will register to form tube receiving and clamping openings, when the jaws are swung together, together with means to positively clamp and hold said jaws together in adjacent positions with the grooves or recesses in registration, and flaring means to be used to operate or function upon a tube or pipe end held and clamped in registering openings of the two jaw members.

Still another purpose is to so construct the parts that the jaw members can be readily and conveniently and quickly swung to either of the two adjusted positions, to thus present the mating recesses to give tube or pipe receiving and clamping openings of the desired diameter, and to arrange and include with said jaw members means by which the jaws are positioned to properly register or mate with the grooves or recesses, and means by which the jaws are positively held and locked in the tube holding or clamping relation.

Yet another object is to provide the two jaws having recesses at opposite sides and swingably connected together to permit reversal to bring the opposite sides into adjacent or abutting relation, together with link or clip means swingably and slidably carried by one jaw to be fitted in each of the adjusted positions to embrace the swinging ends of the two jaws and means associated with said link to clamp the jaws in pipe or tube holding relation.

A still further object is to provide a handle on one jaw member to be grasped for holding and manipulating the tool, and to provide a second handle serving a similar purpose and at the same time incorporated with clamping means to lock the two jaws in adjacent tube clamping relation when the two handles are grasped or held, as will be usual and customary when the tool is being used.

With the above and other objects and purposes in view, which will be apparent to those skilled in the art, or which are inherent in the construction and use of the parts, my invention includes certain novel features of construction and combinations and arrangements of parts which will be hereinafter set forth in connection with the drawings and then pointed out in the claims.

In the drawings:

Figure 1 is a view in side elevation showing a tool constructed in accordance with my invention and with the parts adjusted to one relation for use.

Fig. 2 is a view similar to Figure 1 illustrating the parts in the opposite setting or adjustment.

Fig. 3 is an end elevational view as the parts are shown in Figure 1.

Fig. 4 is a transverse sectional view substantially on line 4—4 of Figure 1.

Fig. 5 is a fragmentary view partly in section to better show the jaw securing and clamping means as illustrated in Figs. 1 and 2.

Fig. 6 is a fragmentary broken away view in elevation illustrating a relative setting or movement of the parts to permit the release and swinging of the jaw members from one position to another.

Fig. 7 is a view in side elevation illustrating a modified construction.

Fig. 8 is a view similar to Fig. 7 showing the jaws in a reversed or opposite setting.

Fig. 9 is a fragmentary sectional view to better show the jaw clamping or holding means of the embodiment of Figs. 7 and 8.

Fig. 10 is a view similar to Fig. 5 to show a modified form of clamping jaw.

Fig. 11 is a fragmentary transverse sectional view through the jaw structures illustrating a modified form of flaring means mounting.

The jaw members 1 and 2 are conveniently made substantially rectangular in cross section, as perhaps best shown in Fig. 4. The jaw members 1 and 2 are preferably each bifurcated at one end to provide bearing openings in which a pivot link 3 is fitted, the two jaw members 1 and 2 being swingably or pivotally connected at the ends of the link 3 by pins 4 and 5, or by other suitable members or means. Through this swinging or pivotal mounting at the ends of the link 3, the jaw members are associated in such manner that they can be readily opened and swung back to bring opposite faces into abutting juxtaposition, substantially as shown in Figs. 1 and 2. Each jaw member has on opposite faces or sides thereof a plurality of recesses or grooves, as indicated at 6 and 7, the recesses or grooves being located and positioned along the sides of the jaw members in such relation that as the jaw members are brought together the recesses or grooves of the two jaw members will mate or register to form and serve as substantially circular tube or pipe receiving and clamping openings. These recesses or grooves are formed to provide openings of different diameters, to thus hold and clamp different sizes of pipes and tubes, and as the jaws are adjusted to the position shown in Figure 1, the recesses or grooves 7 mate and register to form pipe or tube receiving and clamping openings, whereas in the opposite adjustment and setting of the jaws the recesses or grooves 6 mate and register, substantially as shown in Fig. 2.

It is perhaps preferable that the recesses or grooves 6 and 7 be staggered or offset on opposite sides of the jaw members 1 and 2, since this will permit the use of relatively narrower and lighter weight jaw portions, without correspondingly sacrificing rigidity or strength; and, by providing the recesses or grooves on the opposite sides of the jaw members it is possible to accommodate almost double the number of tube or pipe sizes with a short length for the jaw members 1 and 2.

As the link 3 will permit of more or less endwise shifting or relative movement of the jaw members 1 and 2, it is substantially essential that provision be made to insure registering or mating of the recesses or grooves in each of the positions of the jaw members, and this is accomplished by providing extending lugs 8 and 9 on opposite faces of one jaw member, and providing recesses or sockets 10 and 11 on the abutting face of the remaining member to receive these extending lugs, as is perhaps best shown in Fig. 5.

A hand grip portion or handle 12 is provided as an extension at the swinging end of the jaw member 1, which handle can be conveniently grasped to hold and manipulate the tool while the same is being used.

As shown in Figs. 1 and 2, a substantially U-shaped link means or clip 13 is provided with slotted openings 14 extending longitudinally in the opposite sides or arms thereof, and this link means or clip 13 is fitted swingably and slidably around the swinging ends of the jaw members 1 and 2, a pin 15 being provided to extend laterally from the jaw member 1 into the slotted openings 14 to thus retain the link means 13 against displacement or loss, while at the same time permitting the desired swinging and sliding movement, for reasons and purposes to be hereinafter more fully described.

A second handle or hand grip portion 16 is pivotally or swingably connected with the link means 13, by means of a pivot or hinge pin 17, and this handle or hand grip portion 16 is provided with a cam portion 18 on one side, laterally of the center of pivot or swinging, to be engaged and bear against the outer side of the jaw member 2, substantially as shown in Figure 1, to clamp the two jaw members 1 and 2 in the abutting or adjacent position so that the openings formed by the grooves or recesses 7 are made available for pipe or tube clamping and holding use. As the handles 12 and 16 are grasped to hold and manipulate the tool, the handle 16 will be urged toward the handle 12, in consequence of which the cam portion 18 is retained at all times in the jaw clamping and locking relation.

As is shown in Fig. 6, when the handle 16 is swung outwardly to release the cam portion 18 from the jaw clamping relationship, the link means 13 can be swung down and then slid over to arrange and position this link means to accommodate the jaw member 2 when swung to the second or opposition position of use, as disclosed in Fig. 2. When the handle 16 is again swung down the cam portion 18 engages against the outer side of the jaw member 1 to draw and clamp the jaw member 2 thereagainst.

The two handles 12 and 16 can be knurled, or can be otherwise treated or formed to present roughened outer surfaces to give a better handgrip hold and due to the fact that the handles are more or less spread or located off center, laterally, the handles 12 and 16 serve for ready gripping and holding and handling or manipulation of the tool.

As shown in Fig. 3, a flaring yoke 19 can be fitted on the two jaw members 1 and 2, when closed in either of their settings or adjustments, to be movable substantially along the length of the jaws to center over and substantially axially with the various pipe or tube receiving and clamping openings. This yoke member 19 has a flaring screw 20 fitted through a threaded opening therein, and a flaring head 21 is provided on the inner end of the screw in position to operate upon a tube end held in one of the openings accomplished by the registry of the recesses in the abutting faces of the jaws 1 and 2, a handle portion 22 being provided on the outer end of the screw 20 for rotation in moving the flaring head 21 into and from the tube flaring position. Hook portions 23, or other suitable stops, are provided on the legs of the yoke member 19 to engage with the jaw members 1 and 2 and thus hold the yoke member in position during the flaring operation. Obviously, the yoke member can be readily and quickly removed to permit opening and reversal of the jaw members, and can be adjusted or moved to position upon the jaws to center the flaring head 21 axially with respect to any desired tube or pipe clamping opening.

As illustrated in Fig. 4, the recesses or grooves 6 and 7 are preferably provided with scoring or roughening, as at 24, to give a better grip and holding upon the tube or pipe, and the jaw members 1 and 2 are countersunk around the openings, as at 25, to shape or confine the outer flare of the pipe or tube end. Obviously, the countersunk recessed formation at 25 can be formed with an oblique or diagonal wall, or with a recessed or rabbeted wall, dependent upon the particular configuration of flare or flange desired to be given to the tube or pipe end, and the working face of the flaring head 21 can of course be varied in its configuration correspondingly.

With the modified construction as shown in Figs. 7, 8 and 9, the jaw members 26 and 27 are formed and are connected substantially after the manner set forth in connection with the jaw members 1 and 2, and one of the jaw members is provided with a hand hold or hand grip or handle portion 28. The jaw members have the recesses or grooves 29 and 30 formed in opposite edges thereof and adapted to be mated with corresponding notches or grooves of the other jaw member to form pipe or tube end receiving and holding openings, and registration or proper adjustment of the jaws can be accomplished and assured in the manner as set forth above, or in any other suitable way.

The link means 31 is of substantially U-shaped form, with a bar 32 extending transversely between the legs of the U-shaped form. The link means 31 has elongated slots 33 formed in the side portions thereof and receiving the ends of a pin 34 extending laterally from one of the jaws, so that the link means 31 is mounted and is movably associated, substantially as is set forth in connection with link 13. The cross bar 32 has a screw threaded opening 35 therethrough, and a clamping screw 36 is turned through this opening to engage with and clamp the two jaw members in closed relation, a wing head 37, or other manual manipulating means being provided on clamp screw 36.

As shown in Figs. 7 and 8, where a plurality of recesses 29 and 30 are provided in opposite edges of the jaw members 26 and 27, even though these may be staggered on opposite side edges, the countersinking will perhaps merge from one recess to another, and it may therefore be desirable that the recesses 29 be countersunk on one side face of the jaws, and that the recesses 30 be countersunk on the opposite side faces of the jaws.

In Fig. 10 I have illustrated an adaptation showing a modified form of cam for clamping the jaws together, and as here shown, the handle 38 has a substantially circular cam portion 39 at one end thereof, this substantially circular cam portion 39 being eccentrically pivoted on pin 40 mounted through the arms of the link means 41. This clamping structure is quite similar in action to that disclosed in Figs. 1, 2, 5 and 6, and it will be understood and appreciated that various forms and mountings of the clamping cams, and other clamping means, might be employed with the link means.

The disclosure in Fig. 11 illustrates a modified form of mounting for the flaring yoke, and as here illustrated, the yoke 42, of substantially U-shaped form, has the legs or arms thereof extending adjacent to and spaced from the outer side edges of the jaw members 43 and 44. The flaring screw 45 and flaring head 46 can be constructed and mounted in connection with the yoke 42 in substantially the manner previously described. The jaw members 43 and 44 are provided with countersunk center openings 47 and 48; substantially centered on opposite sides of the axial center of each of the pipe or tube receiving and clamping openings as formed by the recesses or grooves. A beveled center pin 49 is provided on one arm of the yoke 42, and a clamp screw 50 is turned through a threaded opening in the opposite arm of the yoke, this clamp screw being provided with a beveled end to fit in the correspondingly shaped countersunk center opening in the jaw. A wing head 51, or other manual manipulating means, can be provided for the clamp screw 50.

From the foregoing it will be seen that I have provided a flaring tool adaptable for use in clamping and holding and operating upon pipes or tubes of a considerable number of different diameters or sizes, and that means is provided to permit ready and free adjustment and reversal and manipulation to bring the parts into pipe or tube holding relation.

While I have herein shown and described only certain specific embodiments and have suggested only certain modifications, it will be appreciated that many changes and variations may be made to suit different requirements of use, without departing from the spirit and scope of my invention.

I claim:

1. A flaring tool comprising, a pair of jaws having grooved recesses on opposite sides thereof positioned to register as tube receiving and clamping openings when the jaws are brought together, means swingably and reversibly connected to one end of each jaw and thus allowing reversal and opposite juxtapositioning of the sides to bring the recesses thereof into registering relation, means to position said jaws in each adjacent position, link means swingably mounted on the swinging portion of one of said jaws and also movable lengthwise of the link whereby the link means can be adjusted to embrace the said jaws in each of the closed positions, clamp means associated with said link means to lock the jaws in tube clamping relation, and tube flaring means to operate upon the end of a tube clamped by said locked jaws.

2. A flaring tool comprising, a pair of jaws having grooved recesses on opposite sides thereof positioned to register as tube receiving and clamping openings when the jaws are brought together, means swingably and reversibly connected to one end of each jaw and thus allowing reversal and opposite juxtapositioning of the sides to bring the recesses thereof into registering relation, means to position said jaws in each adjacent position, substantially U-shaped link means swingably mounted on the swinging portion of one of said jaws and also movable lengthwise of the link whereby the link means can be adjusted to embrace the said jaws in each of the closed positions, clamp means carried by said link means to lock the jaws in tube holding and clamping relation, and tube flaring means.

3. A flaring tool comprising, a pair of elongated jaw members having substantially semicircular grooved recesses in both side faces thereof, link means swingably connected to one end of each jaw pivotally mounting the jaws for reversal to juxtaposition opposite recessed edges thereof with the recesses in registry to provide tube receiving and clamping openings, link means swingably carried at the swing part of one jaw member and movable in a direction thereon endwise of the link to embrace the other jaw member in each adjusted position, clamp means on the link means to draw said jaws into tube clamping relation, and tube flaring means carried by the jaws.

4. A flaring tool comprising, a pair of elongated jaw members having substantially semicircular grooved recesses in both side faces thereof, link means swingably connected to one end of each jaw pivotally mounting the jaws for reversal to juxtaposition opposite recessed edges thereof with the recesses in registry to provide tube receiving and clamping openings, substantially U-shaped link means having elongated slots through the arms thereof fitted around the swinging end of one jaw member, extending pin means on said jaw member loosely received within the slotted openings and thus mounting the link means for swinging and sliding movement to receive and embrace the swinging end of the other jaw member in each of its oppositely adjusted juxtapositions, clamp means carried by the link means holding the juxtapositioned jaw members in tube clamping relation, and tube flaring means.

5. A flaring tool comprising, a pair of elongated jaw members having substantially semicircular grooved recesses in both side faces thereof, link means swingably connected to one end of each jaw pivotally mounting the jaws for reversal to juxtaposition opposite recessed edges thereof with the recesses in registry to provide tube receiving and clamping openings, substantially U-shaped link means having elongated slots through the arms thereof fitted around the swinging end of one jaw member, extending pin means on said jaw member loosely received within the slotted openings and thus mounting the link means for swinging and sliding movement to receive and embrace the swinging end of the other jaw member in each of its oppositely adjusted juxtapositions, a handle extension at the swinging end of one jaw member, clamping cam means swingably carried by said link means, a handle operatively connected with said cam means and swingable adjacent to the handle extension for clamping the jaws in tube holding relation in which adjacent position the handle and handle extension serve as hand grip portions for holding and manipulation of the tool, and tube flaring means carried by said jaw members and movable thereon to operate upon a tube end clamped and held in mating recesses of the jaw members.

6. A tube flaring tool comprising, a pair of jaws provided with recesses on the opposite side edges thereof, link means connected to one end of each jaw whereby said jaws are swingably reversible to bring the opposite recessed faces together with the recesses thereof forming tube receiving and clamping openings, link means swingably mounted on the swinging part of one of said jaws and movable in a line corresponding with the longitudinal axis of the link whereby the link means is adjustable to allow the reversal of the jaw members and is movable endwise in line with its length to embrace the jaws in each position, clamp means cooperating with said link means operable to clamp said jaws together in each of the tube clamping positions for use, and tube flaring means carried by said jaw members to operate on a tube end clamped and held by said jaws.

LOUIS C. CATTOI.